United States Patent
Kester et al.

(10) Patent No.: US 9,239,263 B2
(45) Date of Patent: Jan. 19, 2016

(54) IMAGE MAPPED SPECTROPOLARIMETRY

(75) Inventors: Robert T. Kester, Pearland, TX (US); Tomasz S. Tkaczyk, Houston, TX (US)

(73) Assignee: William Marsh Rice University, Houston, TX (US)

( * ) Notice: Subject to any disclaimer, the term of this patent is extended or adjusted under 35 U.S.C. 154(b) by 42 days.

(21) Appl. No.: 13/992,101

(22) PCT Filed: Nov. 30, 2011

(86) PCT No.: PCT/US2011/062504
§ 371 (c)(1),
(2), (4) Date: Jul. 17, 2013

(87) PCT Pub. No.: WO2012/082366
PCT Pub. Date: Jun. 21, 2012

(65) Prior Publication Data
US 2013/0321806 A1    Dec. 5, 2013

Related U.S. Application Data

(60) Provisional application No. 61/422,748, filed on Dec. 14, 2010.

(51) Int. Cl.
*G01J 3/28* (2006.01)
*G01J 3/447* (2006.01)
(Continued)

(52) U.S. Cl.
CPC .. *G01J 3/447* (2013.01); *G01J 3/02* (2013.01); *G01J 3/0224* (2013.01); *G01J 3/2823* (2013.01); *G01J 4/04* (2013.01)

(58) Field of Classification Search
CPC ........... G01J 3/447; G01J 4/04; G01J 3/2823; G01J 3/0224
See application file for complete search history.

(56) References Cited

U.S. PATENT DOCUMENTS

| 8,045,177 B2 | 10/2011 | Tearney et al. |
| 8,174,694 B2 * | 5/2012 | Bodkin .......................... 356/328 |

(Continued)

FOREIGN PATENT DOCUMENTS

WO    2010/053979 A2    5/2010

OTHER PUBLICATIONS

Gao et al.; "Compact Image Slicing Spectrometer (ISS) for hyperspectral fluorescence microscopy"; Optics Express, vol. 17, No. 15, Jul. 6, 2009, pp. 12293-12308.*

(Continued)

*Primary Examiner* — Gregory J Toatley
*Assistant Examiner* — Shawn Decenzo
(74) *Attorney, Agent, or Firm* — Osha Liang LLP (57) ABSTRACT

A method for imaging a sample, the method includes, during a single acquisition event, receiving a first polarization-encoded EM field for a first point and a second polarization-encoded EM field for a second point. The method further includes re-directing the first polarization-encoded EM field along a first pre-determined direction to a first location on a dispersing re-imager and the second polarization-encoded EM field along a second pre-determined direction to a second location on the dispersing re-imager. The method further includes spectrally dispersing the first polarization-encoded EM field to obtain a first spectrum, re-imaging the first spectrum onto a first location on a detector, spectrally dispersing the second polarization-encoded EM field to obtain a second spectrum, re-imaging the second spectrum onto a second location on the detector, and detecting the first re-imaged spectrum and the second re-imaged spectrum.

12 Claims, 11 Drawing Sheets

(51) Int. Cl.
*G01J 3/02* (2006.01)
*G01J 4/04* (2006.01)

(56) References Cited

U.S. PATENT DOCUMENTS

2003/0025913 A1 2/2003 Izatt et al.
2005/0171438 A1 8/2005 Chen et al.
2008/0088852 A1 4/2008 Rogers et al.

OTHER PUBLICATIONS

International Search Report issued in PCT/US2011/062504 mailed on Mar. 9, 2012 (2 pages).
Written Opinion of the International Searching Authority issued in PCT/US2011/062504 mailed on Mar. 9, 2012 (7 pages).
Aumiller, R. W. et al.; "Snapshot imaging spectropolarimetry in the visible and infrared"; Proceedings of SPIE, vol. 6972, Jan. 1, 2008, pp. 69720D-1-69720D-9 (9 pages).
Sabatke, D. et al.; "Snapshot imaging spectropolarimeter"; Optical Engineering, vol. 41, No. 5, Jan. 1, 2002, pp. 1048-1054 (7 pages).
Kim, J. et al.; "Snapshot imaging spectropolarimeter utilizing polarization gratings"; Proceedings of SPIE, Jan. 1, 2008, pp. 708603-1-708603-10 (10 pages).
Gao, L. et al.; "Snapshop Image Mapping Spectrometer (IMS) with high sampling density for hyperspectral microscopy"; Optics Express, vol. 18, No. 14, Jul. 5, 2010, pp. 14330-14344 (15 pages).
International Preliminary Report on Patentability from PCT/US2011/062504 dated Jun. 27, 2013 (7 pages).
International Preliminary Report on Patentability from PCT/US2011/062503 dated Jun. 27, 2013 (7 pages).
Li, P. et al.; "Spectral-Domain Optical Coherence Tomography and Applications for Biological Imaging"; Biophotonics, Nonophotonics and Metamaterials, 2006. Metamaterials 2006. International Symposium on, IEEE, PI, Oct. 1, 2006, pp. 222-225 (4 pages).
Fercher, A. F. et al.; "Optical coherence tomography—principles and applications"; Reports on Progress in Physics, Institute of Physics Publishing, Bristol, GB, vol. 66, Jan. 20, 2003, pp. 239-303 (65 pages).

* cited by examiner

IMAGE MAPPED SPECTROPOLARIMETRY

BACKGROUND

Systems for spectropolarimetry are essential tools for diagnostic imaging of all kinds. For example, spectropolarimetry systems have been used for object differentiation in aerial imaging or in microscopy. Traditional spectropolarimetry systems require moving parts such as a rotating retarder and are not easily adapted for multi-spectral use.

SUMMARY

In general, in one aspect, the invention relates to a method for imaging a sample. The method includes, during a single acquisition event, receiving a plurality of polarization-encoded electromagnetic (EM) fields from a plurality of points on a sample comprising a first polarization-encoded EM field for a first point and a second polarization-encoded EM field for a second point; redirecting the first polarization-encoded EM field along a first pre-determined direction to a first location on a dispersing re-imager and the second polarization-encoded EM field along a second pre-determined direction to a second location on the dispersing re-imager; spectrally dispersing the first polarization-encoded EM field to obtain a first spectrum; re-imaging the first spectrum onto a first location on a detector; spectrally dispersing the second polarization-encoded EM field to obtain a second spectrum; re-imaging the second spectrum onto a second location on the detector; and detecting the first re-imaged spectrum and the second re-imaged spectrum.

In general, in one aspect, the invention relates to a system. The system includes an image mapper configured to, during a single acquisition event, receive a plurality of polarization-encoded electromagnetic (EM) fields from a plurality of points on a sample comprising a first polarization-encoded EM field for a first point and a second polarization-encoded EM field for a second point, and redirect the first polarization-encoded EM field along a first pre-determined angle to a first location on a dispersing re-imager and the second polarization-encoded EM field along a second pre-determined angle to a second location on the dispersing re-imager. The system further includes a dispersing re-imager configured to spectrally disperse the first polarization-encoded EM field to obtain a first spectrum, re-image the first spectrum on to a first location on a detector, spectrally disperse the second polarization-encoded EM field to obtain a second spectrum, re-image the second spectrum on to a second location on the detector. The system further includes a detector configured to detect the first re-imaged spectrum and the second re-imaged spectrum.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to image mapped spectropolarimetry. More specifically, embodiments of the invention relate to channeled spectropolarimetry employing an image mapping spectrometer. One or more embodiments of the invention relate to a system and method for producing an image of a sample or a scene that includes both spectral and polarization information in a single snapshot or single acquisition event.

For purposes of this invention, a sample is any biological or non-biological material, object, or specimen, which may be imaged. In one embodiment of the invention, a sample includes a number of sample points. A sample point may reside at a particular (x,y,z) location in the sample. Sample points may further serve as source points for backscattered electromagnetic (EM) radiation.

For purposes of this invention, a scene includes all of the objects that fall within the field of view of the image mapping spectropolarimeter. In one embodiment of the invention, a scene includes the ground as seen from an aircraft or other airborne object. In one embodiment of the invention, a scene includes multiple microscopic objects.

In one embodiment of the invention, a single acquisition event may occur when a detector simultaneously detects a number of EM fields emanating from multiple points on the surface (in the x,y plane) of a sample being illuminated. The EM fields emanating from each of the multiple points may correspond to EM fields emanating from various polarizing objects, for example, a planar reflecting surface, for the point located at the x,y position in the x,y plane. In one embodiment of the invention, emanating refers to EM waves that are reflected, scattered, backscattered, or otherwise emitted from a location on the sample. In one embodiment of the invention, the acquisition event begins and ends when the detector begins to detect EM radiation and finishes detecting the EM radiation, respectively.

EM radiation, EM waves, and EM fields are assumed to be synonymous and may be used interchangeably within the following detailed description. EM fields may be described as transverse waves having a polarization state described by the well known stokes parameters $S_0$, $S_1$, $S_2$, $S_3$. A EM field may be defined as an EM field that includes many different wavelengths or frequencies. It will be understood that image mapping spectropolarimetery may be employed outside the visible EM spectrum.

In one embodiment of the invention, an EM field may originate from a sample point where information relating to the polarizing nature of the sample being imaged at the sample point is encoded within the spectrum of the EM field.

Figure 1:
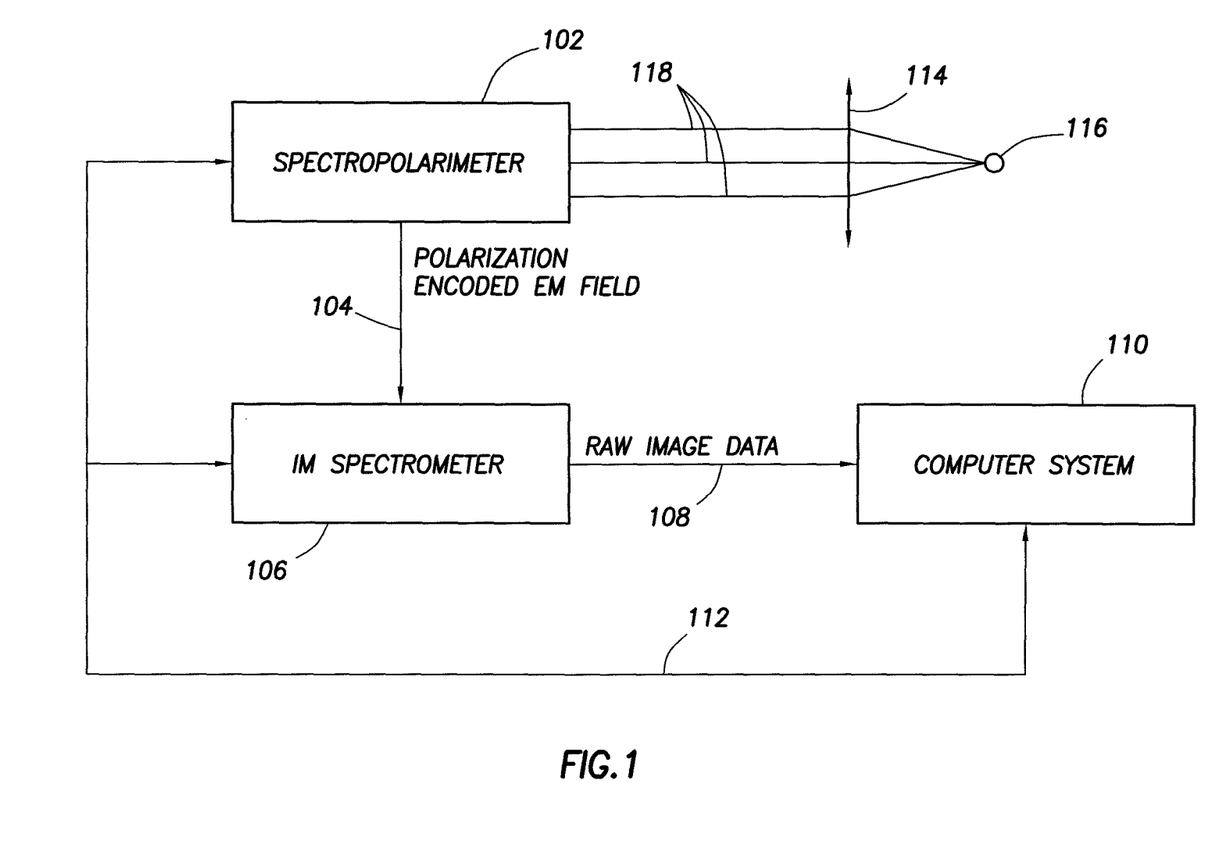
FIG. 1 shows a system in accordance with one or more embodiments of the invention.

FIG. 1 shows a system in accordance with one or more embodiments of the invention. The system includes spectropolarimeter 102 configured to receive emitted EM field 118 that emanates from sample 116. Collecting lens 114 is configured to collect emitted EM field 118. Spectropolarimeter 102 is configured to modulate the spectrum of emitted EM field 118 according to the polarization state of emitted EM field 118, thus, creating polarization encoded EM field 104. Polarization-encoded EM field 104 has encoded within its frequency spectrum polarization information relating to the polarizing nature of sample being imaged. Image mapping spectrometer 106 is configured to receive polarization-encoded EM field 104. Image mapping spectrometer 106 is configured to convert the polarization-encoded EM field 104 into a raw image data cube 108. Raw image data cube 108 may be in the form of a 3D dataset $(x,y,D(x,y,\lambda))$ where $D(x,y,\lambda)$ is the value of a modulated spectrum obtained at every (x,y) sample point that is located within a field of view of the optical system used to image the sample, i.e., every point included in the scene being imaged. Computer system 110 is configured to receive data including raw image data cube 108. In one embodiment of the invention, the computer 110 includes a processor, memory, one or more output devices (e.g., a display, a printer, etc.), one or more input devices (e.g., a keyboard, a mouse, etc.), and software stored in the memory, which when executed by the processor, is configured to process the raw image data cube 108.

Computer system 110 may be further configured to process a plurality of modulated spectra $D(x,y,\lambda)$ and to extract a backscattered polarization profile of the sample. Thus, computer system 110 may convert the 3D dataset to a 2D image of the sample, a 2D spectrum of the sample, and a 2D polarization profile of the sample, each of which may be output to a display. One of ordinary skill will understand that several different methods may be used to convert spectral information into polarization information according to known methods of spectropolarimetery. For example, the modulation of the modulated spectrum may be converted to the values of the four Stokes parameters, $S_0$, $S_1$, $S_2$, $S_3$ using Fourier analysis of the modulated spectrum. Furthermore, the data processing may include standard image mapping spectrometer remapping, and/or include mapping from image sensor pixel directly to wavenumber k. The processing may also include techniques for compensating dispersion in the system. In addition, one of ordinary skill will understand that data processing may be accomplished via hardware that may be integrated into image mapping spectrometer 106.

Further, user feedback 112 may be received at computer system 110 for performing various actions on one or both of the image mapping spectrometer 106 and spectropolarimeter 102. For example, the sample or spectropolarimeter may be moved to allow the viewing of a region of interest (ROI) to the user or the user may wish to zoom into or out of the sample or scene ROI. Zoom may be accomplished spatially and/or spectrally, through the use of hardware (optical zoom) or software (digital zoom).

Figure 2:
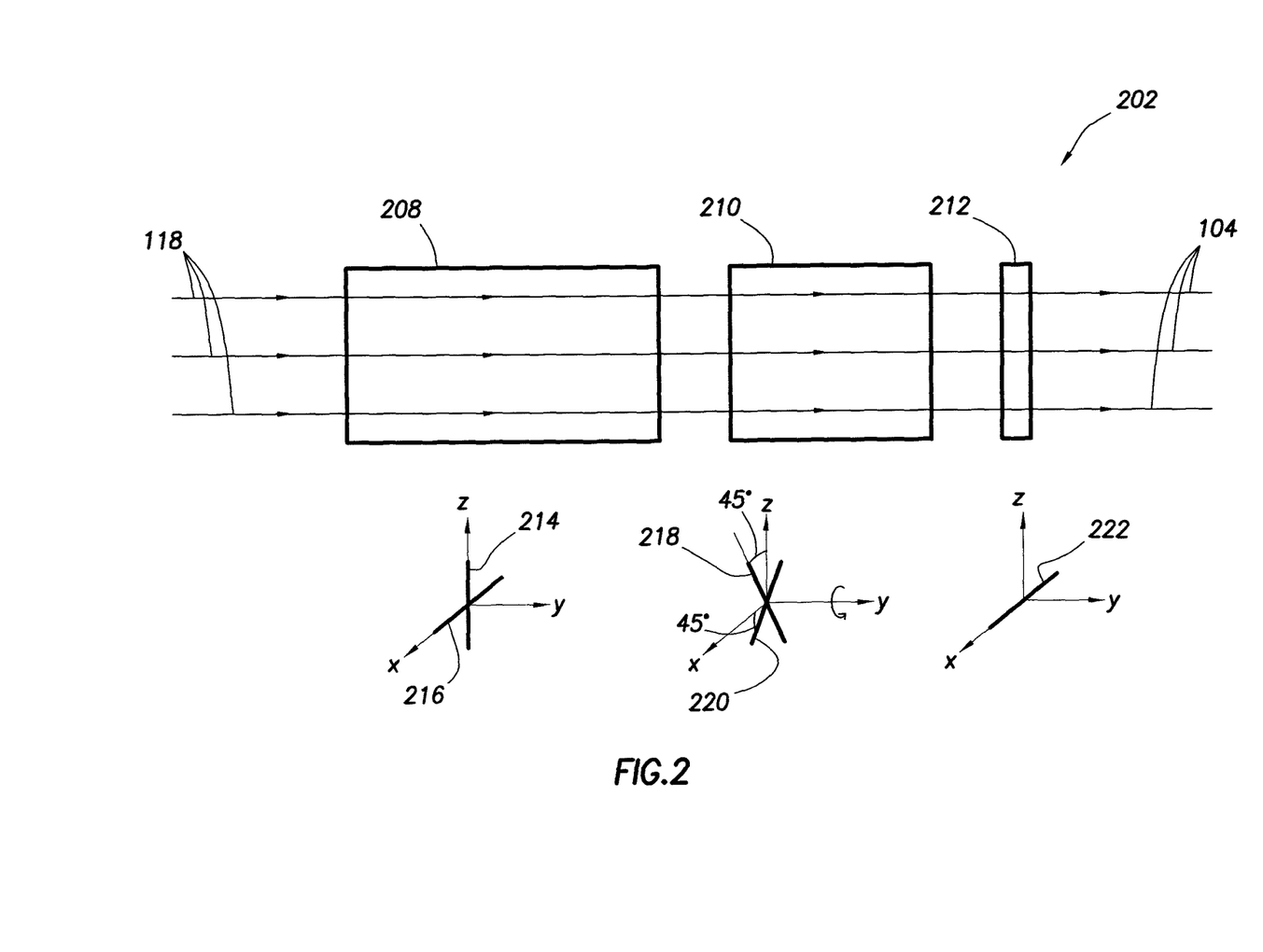
FIG. 2 shows a schematic view of a channeled spectropolarimeter in accordance with one or more embodiments of the invention.

FIG. 2 shows a schematic view of a spectropolarimeter configured to produce a polarization-encoded EM field in accordance with one or more embodiments of the invention. Spectropolarimeter 202 may include first retarder 208, second retarder 210, and polarizer 212. First retarder 208 is configured to receive emitted EM field 118. In accordance with one embodiment, first retarder 208 may be made from a birefringent material having slow axis 214 and fast axis 216 and oriented as shown. Second retarder 210 may be made from a birefringent material having slow axis 218 and fast axis 220 and oriented as shown. Further, fast axis 218 and slow axis 220 of second retarder 210 may be rotated 45 degrees about the y-axis, resulting in a 45 degree angle between the slow and fast axes of first retarder 208 and the slow and fast axes of second retarder 210. Polarizer 212 is configured to transmit EM waves having a polarization direction parallel to transmission axis 222. Transmission axis 222 may be configured to be parallel to fast axis 216 of first retarder 208. Polarizer 212 is further configured to emit polarization-encoded EM field 104. One of ordinary skill will understand that modulation frequencies of polarization-encoded EM field 104 relate to and are affected by the thickness and material composition of first retarder 208 and second retarder 210.

One of ordinary skill will understand that the relative arrangement of the fast and slow axes of the first and second retarders as well as the relative arrangement of the transmission axis of the polarizer may differ from the relative arrangement disclosed herein without departing from the scope of the present invention. One of ordinary skill will understand that many different methods and systems may be used to encode the polarization state of emitted field 118. In accordance with one or more embodiments of the invention, the retarders 208 and 210 may be replaced with bi-refringent prisms that encode the polarization state within the wavefront of emitted EM field 118 rather than in the spectrum of emitted EM field 118. In this case, the bi-refringent prisms may be preferably positioned before the polarizer, in an image plane or a conjugate space. Alternatively, a pair Savart plates may be used in place of retarders 208 and 210 to encode the polarization state of emitted EM field 118. The Savart plates may be preferably positioned in a pupil or its conjugate position. Savart plates are the Fourier equivalent to the birefringent prisms but have advantages in terms of aberration correction over the birefringent prisms.

Polarization-encoded EM field 104 includes 2D spatial information, related to the (x,y) reflectivity of the sample, encoded across the spatial extent of the polarization-encoded EM field 104. The polarization-encoded EM field 104 further includes polarization information encoded within its frequency spectrum. The polarization information is related to the polarizing nature of the sample or scene being imaged.

One of ordinary skill will understand that any known spectropolarimeter geometry may be used without departing from the scope of the invention.

Figure 3:
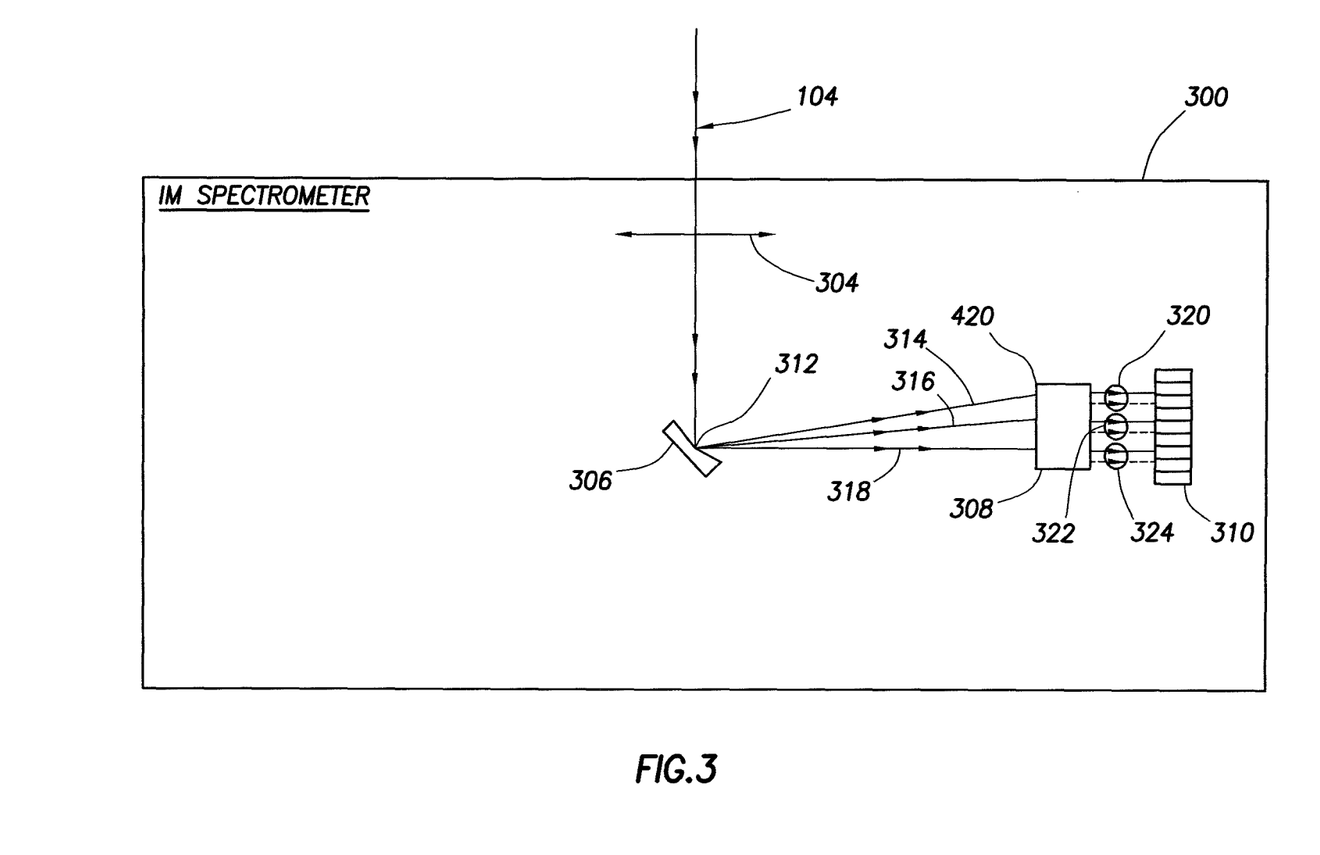
FIG. 3 shows a schematic view of an image mapping spectrometer in accordance with one or more embodiments of the invention.

FIG. 3 shows a schematic view of an image mapping spectrometer in accordance with one or more embodiments of the invention. Image mapping spectrometer 300 includes focusing lens 304, image mapper 306, dispersing reimager 308, and detector array 310. Image mapping spectrometer 300 is configured to receive polarization-encoded EM field 104 originating from spectropolarimeter 202 and to map, spectrally disperse, and reimage polarization-encoded EM field 104 onto detector 310.

Focusing lens 304 is configured to focus polarization-encoded EM field 104 at image mapper 306, thus, forming an image 312 of sample 116 at the image mapper 306. Image mapper 306 is configured to redirect, or map, a plurality of portions of the image 312 to a plurality of locations on the front surface 420 of dispersing reimager 308. For clarity, only 3 mapped image portions, 314, 316, and 318, represented by single rays, are represented in FIG. 3. Dispersing reimager 308 is configured to collect and spectrally disperse mapped image portions 314, 316, and 318 thus creating spectra 320, 322, 324. For clarity, FIG. 3 shows the spectral dispersion that would result if each of the image portions 314, 316, and 318 included only two distinct wavelengths. Furthermore, dispersing reimager 308 is configured to reimage spectra 320, 322, and 324 onto detector 310. Detector 310 may include a 2D array of EM radiation detectors, for example in the form of a charged coupled device (CCD) chip or and array of CCD chips.

Figure 4A:
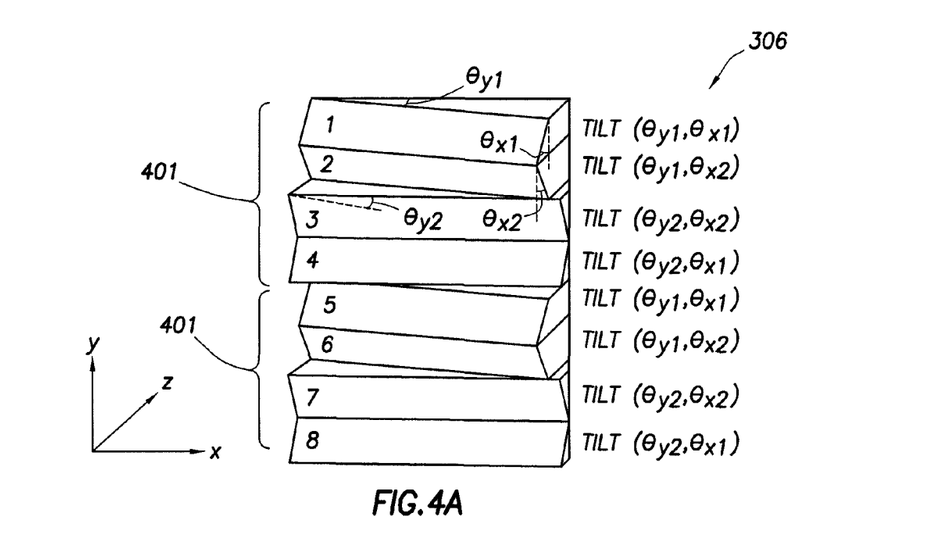
FIG. 4A shows a schematic view of an image mapper in accordance with one or more embodiments of the invention.

FIG. 4A shows a schematic view of an image mapper in accordance with one or more embodiments of the invention. The image mapper 306 includes eight elongated reflective surfaces 1-8. Each reflective surface 1-8 is oriented according to rotation angles $(\theta_y, \theta_x)$ about the y and x axes, respectively. Thus, each reflective surface 1-8 may redirect, or map, a portion of image 312 to a location on the front surface 420 of dispersing reimager 308, as shown in FIG. 3. Image mapper 306 shown in FIG. 4A includes four distinct angles for the eight reflective surfaces arranged in two repeating groups 401.

Figure 4B:
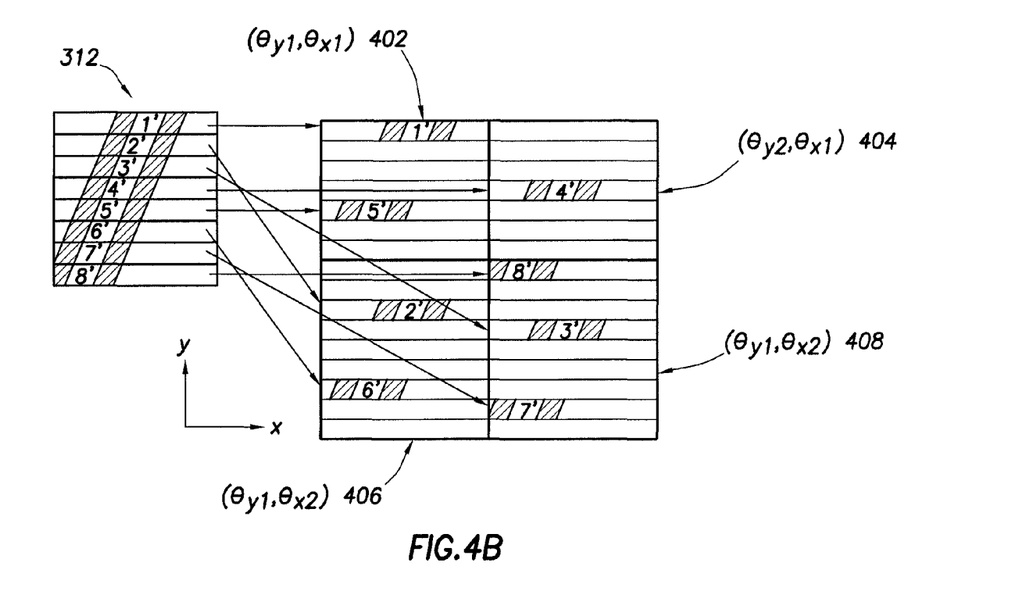
FIG. 4B shows a schematic view of the front surface of a dispersing reimager in accordance with one or more embodiments of the invention.

FIG. 4B shows a schematic view of the front surface 420 of dispersing reimager 308 in accordance with one or more embodiments of the invention. Front surface 420 may be divided into four regions 402, 404, 406, and 408. Each region receives a portion 1'-8' of image 312 that has originated from a reflective surface having one of the four distinct angles. Region 402 corresponds to image portions 1' and 5', which originate from reflective surface 1 and 5, respectively, each having the same tilt of $(\theta_{y1}, \theta_{x1})$. Region 404 corresponds to image portions 4' and 8', which originate from reflective surface 4 and 8, respectively, each having the same tilt of $(\theta_{y2}, \theta_{x1})$. Region 406 corresponds to portions image 2' and 6', which originate from reflective surface 2 and 6, respectively, each having the same tilt of $(\theta_{y1}, \theta_{x2})$. Region 408 corresponds to image portions 3' and 7', which originate from reflective surface 3 and 7, respectively, each having the same tilt of $(\theta_{y2}, \theta_{x2})$.

One of ordinary skill in the art will understand that image mapper 306 may be fabricated with any number of reflective surfaces having any number of angles or sizes and may be grouped or ungrouped according to angle. In general, example M x-angles and N y-angles result in M×N distinct image mapper surfaces that map to M×N distinct regions on front surface 420 of dispersing reimager 308. However, by using M x-angles and N y-angles that are grouped in L repeating groups, a system having M×N×L distinct image mapper surfaces that map to only M×N distinct regions on front surface 420 of dispersing reimager 308 is possible. For example, according to the embodiment shown in FIGS. 4A-4B, M=2, N=2 and L=2. Thus, eight distinct image mapper surfaces are available for image mapping but only four distinct regions (each region receiving a pair of mapped portions of the image 312) on front surface 420 of dispersing reimager 308 are needed for reimaging onto the detector. This may result in smaller, less complicated reimaging optics and smaller, less complicated detectors when compared to image mappers that do not employ angle grouping.

One of ordinary skill in the art will understand that the image mapper may be a refractive or diffractive optical element rather than a reflective optical element without departing from the scope of the disclosure. Furthermore, any optical element known in the art that can induce a suitable angular deflection in the path of a beam of EM radiation may be used. For example, prisms may be used induce the deflection or optical fibers or any other suitable waveguide may be used to redirect the image to the dispersing reimager.

Furthermore, an image mapper may include dynamic components to allow for dynamic operations, for example optical zoom. For example, dynamic microelectromechanical system ("MEMS") mirror arrays may be used in place of the static mirror surfaces disclosed above. In addition, liquid crystal modulators or micro fluidic based refractive liquid modulators may be employed.

Furthermore, one of ordinary skill in the art will recognize that a telescope or beam expander (not shown) may be optionally inserted into image mapping spectrometer 106, for example, in front of focusing lens 304 in order to preserve the image resolution by matching the size of the image point spread function (the diffraction limited spot size) with the width of a single reflective surface 1-8 of the image mapper 306. In another embodiment of the invention, the beam expander may be configured to be telecentric in both image and object space.

Figure 5:
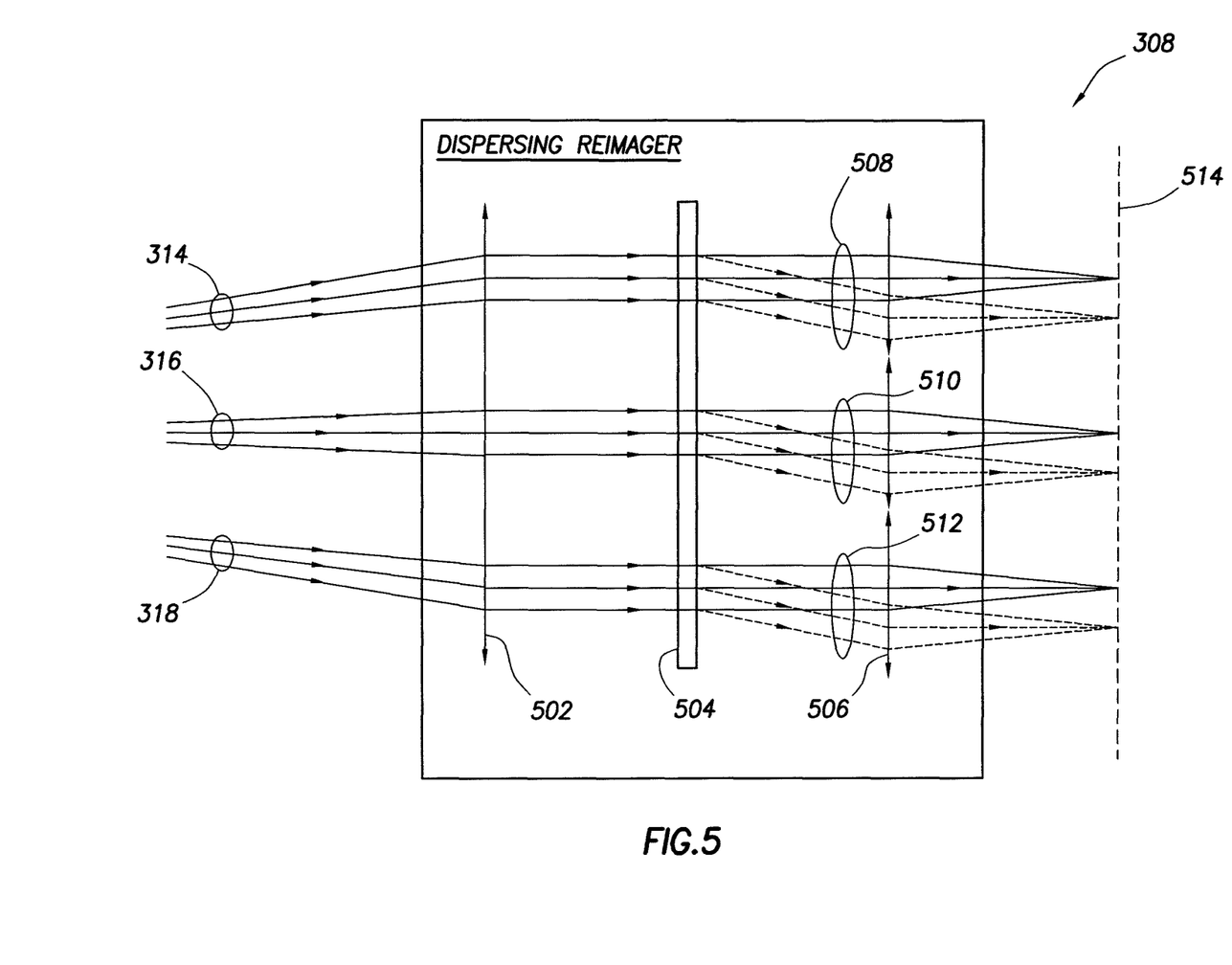
FIG. 5 shows a schematic view of a dispersing reimager in accordance with one or more embodiments of the invention.

FIG. 5 shows a schematic view of a dispersing reimager in accordance with one or more embodiments of the invention. For clarity, only three mapped image portions, 314, 316, and 318, represented by groups of three rays each are depicted. Dispersing reimager 308 includes collecting lens 502, dispersive element 504, and reimaging lens array 506. Collecting lens 502 is configured to collimate mapped image portions 314, 316, and 318. Dispersive element 504 is configured to spectrally disperse the collimated mapped image portions 314, 316, and 318. Dispersive element 504 may include any optical element known in the art having dispersive characteristics, for example, a single prism or diffraction grating. Furthermore, dispersive element 504 may include of an array of prisms or diffraction gratings. For clarity, only two sets of dispersed rays are shown in FIG. 5 as would be the case for mapped image portions including only two spectral components. As shown in FIG. 5, the dispersive element 504 is configured to spatially separate the spectral components of collimated mapped image portions 314, 316, and 318 to form image mapped spectra 508, 510, and 512. Reimaging lens array 506 is configured to reimage image mapped spectra 508, 510, and 512 onto detector plane 514.

One of ordinary skill in the art will recognize that a telescope or beam expander (not shown) may be optionally inserted into dispersing reimager 308, for example, between collecting lens 502 and dispersive element 504 in order to adjust the spatial extent of collimated mapped image portions 314, 316, and 318 in order to match the spatial extent of the reimaging lens array 506, as necessary. Furthermore, one of ordinary skill in the art will recognize that dispersive element 504 may include dynamic or tunable dispersers that enable optical zooming of spectral (and, thus, depth) ROIs. Furthermore, one of ordinary skill in the art will recognize that the individual elements of the dispersive imager 308 may be reordered, without departing from the scope of the invention as disclosed herein. For example, reimaging lens array 506 may come before dispersive element 504.

Figure 6:
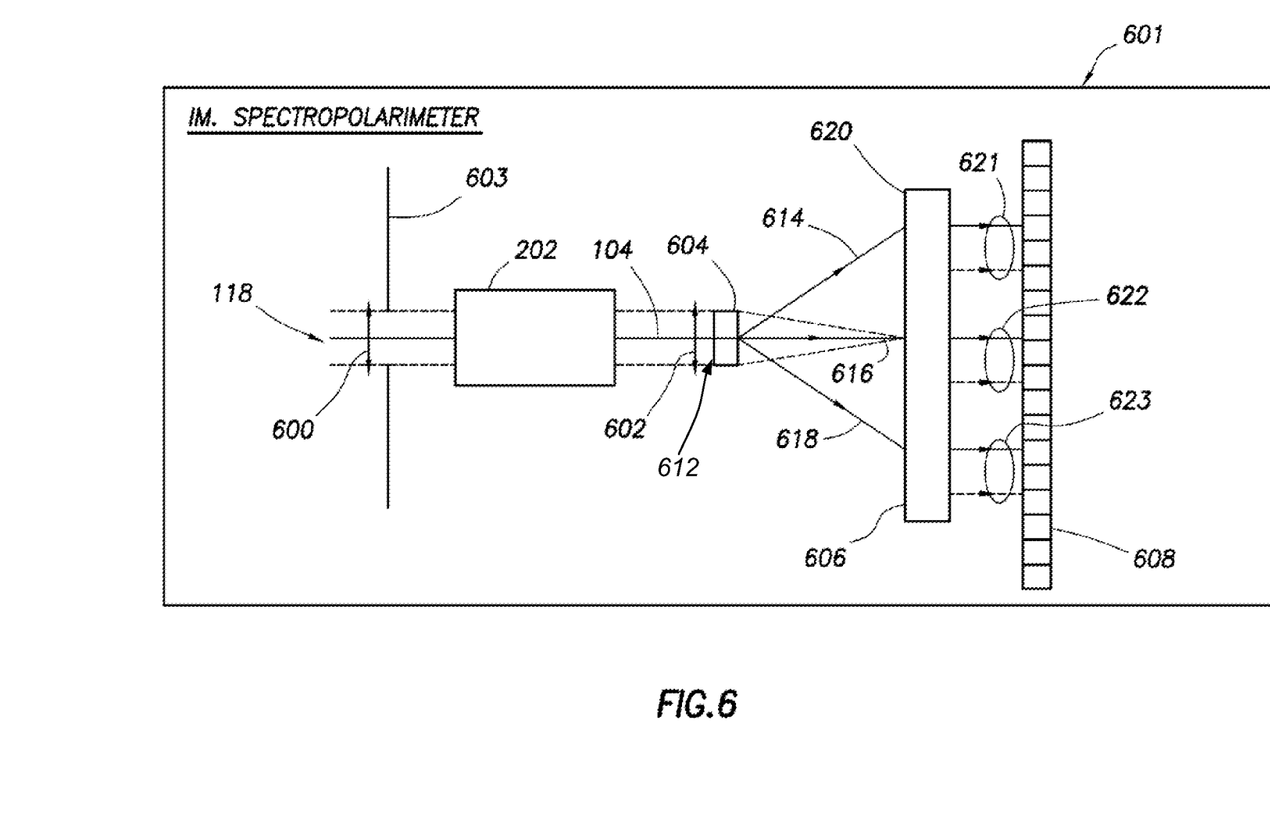
FIG. 6 shows a schematic view of a image mapping spectropolarimeter in accordance with one or more embodiments of the invention.

FIG. 6 shows a schematic view of an image mapping spectropolarimeter 601 in accordance with one or more embodiments of the invention. The image mapping spectropolarimeter 601 may be employed as part of the system for image mapped spectropolarimetry as shown in FIG. 1. The image mapping spectropolarimeter 601, includes focusing lens 600, spectropolarimeter 202, field lens 602, refractive image mapper 604, dispersing reimager 606, and detector 608. Furthermore, detector 608 may include a 2D array of photo-detectors, for example in the form of a CCD chip or and array of CCD chips.

Focusing lens 600 is configured to focus polarization-encoded EM field 104 at refractive image mapper 604, forming an image 612 of sample 116 at the refractive image mapper 604. Field lens 602 is configured to preserve high optical throughput and compactness of the image mapping spectropolarimeter 601 by re-imaging the exit pupil 603 of focusing lens 600 onto dispersing reimager 606. Refractive image mapper 604 is configured to redirect, or map, a plurality of portions of image 612 to a plurality of locations on the front surface 620 of dispersing reimager 606. For clarity, only three mapped image portions, 614, 616, and 618, represented by single rays are represented in FIG. 6. Field lens 602 is located in close proximity to refractive image mapper 604, thus, facilitating the redirection of mapped image portions 614, 616, 618 to the dispersing reimager 606 over a relatively short distance without the need for a bulky large diameter collecting lens (e.g., collecting lens 502 shown in FIG. 5). Dispersing reimager 606 is configured to collect and spectrally disperse mapped image portions 614, 616, and 618 thus creating spectra 621, 622, 623. For clarity, FIG. 6 shows the spectral dispersion that would result if each of image portions 614, 616, and 618 included only two distinct wavelengths. Furthermore, dispersing reimager 606 is configured to reimage spectra 621, 622, 623 onto detector 608.

In accordance with one or more embodiments of the invention, refractive image mapper 604 may include an array of prisms. Furthermore, refractive image mapper 604 may be manufactured using methods such as diamond raster fly cutting from a machinable optical material such as zinc sulfide. Furthermore, refractive image mapper 604 may be manufactured by ruling, injection molding, glass press molding, hot embossing, or any other method known in the art.

In accordance with one or more embodiments of the invention, the retarders 208 and 210 may be further separated from polarizer 212, allowing for polarizer 212 to be positioned in any optical space after the retarding elements. The preferred locations for polarizer 212 and retarders 208 and 210 are in the pupil spaces (i.e., collimated light regions). In addition, both retarders or just one may be used in the system. One element will provide a reduced number of stokes parameters.

In accordance with one or more embodiments of the invention, an array of analyzers may be located on the detector surface, for example on the surface of detector 608 to determine the polarization state of the image. The analyzers may be arranged such that one point spread function would cover four pixels with each pixel including its own analyzer arranged at it own angle.

Figure 7:
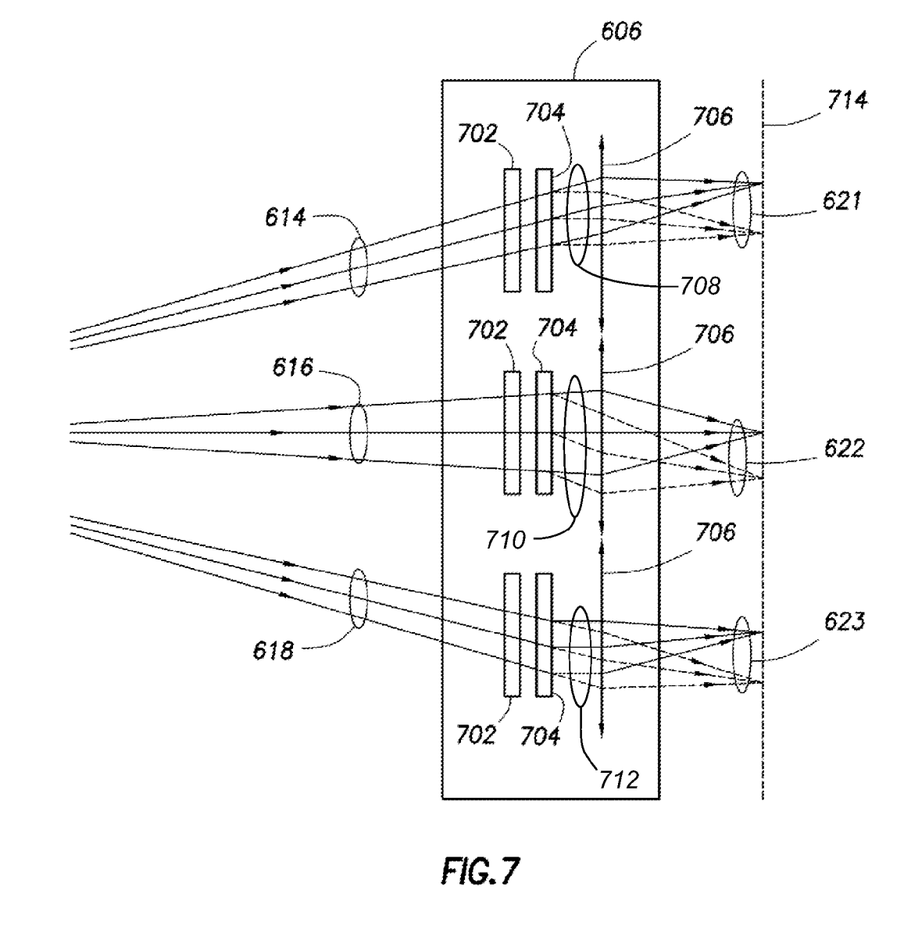
FIG. 7 shows a schematic view of a dispersing reimager in accordance with one or more embodiments of the invention to be employed in a compact, high resolution image mapping spectrometer.

FIG. 7 shows a schematic view of a dispersing reimager 606 in accordance with one or more embodiments of the invention to be employed in a compact, high resolution image mapping spectrometer 601. For clarity, only three mapped image portions, 614, 616, and 618, are depicted. Dispersing reimager 606 includes an array of field of view correctors 702, an array of dispersive elements 704, and an array of reimaging lenses 706. Field of view correctors 702 are configured to laterally shift the fields of view of each of reimaging lens 706 to ensure that the dispersing reimager 606 is within the field of view of each reimaging lens 706. Dispersive elements 704 are configured to spectrally disperse the mapped image portions 614, 616, and 618. Dispersive element 704 may include any optical element known in the art having dispersive characteristics, for example, a single prism, a prism pair or a diffraction grating. For clarity, only two sets of dispersed rays are shown in FIG. 7 as would be the case for mapped image portions including only two spectral components. As shown in FIG. 7, the dispersive elements 704 are configured to spatially separate the spectral components of mapped image portions 614, 616, and 618 to form image mapped spectra 708, 710, and 712. Reimaging lenses 706 are configured to reimage image mapped spectra 708, 710, and 712 onto detector plane 714.

Furthermore, one of ordinary skill in the art will recognize that the individual elements of the dispersive imager 606 may be reordered, without departing from the scope of the invention as disclosed herein. For example, reimaging lens array 706 may come before dispersive element 704.

Figure 8:
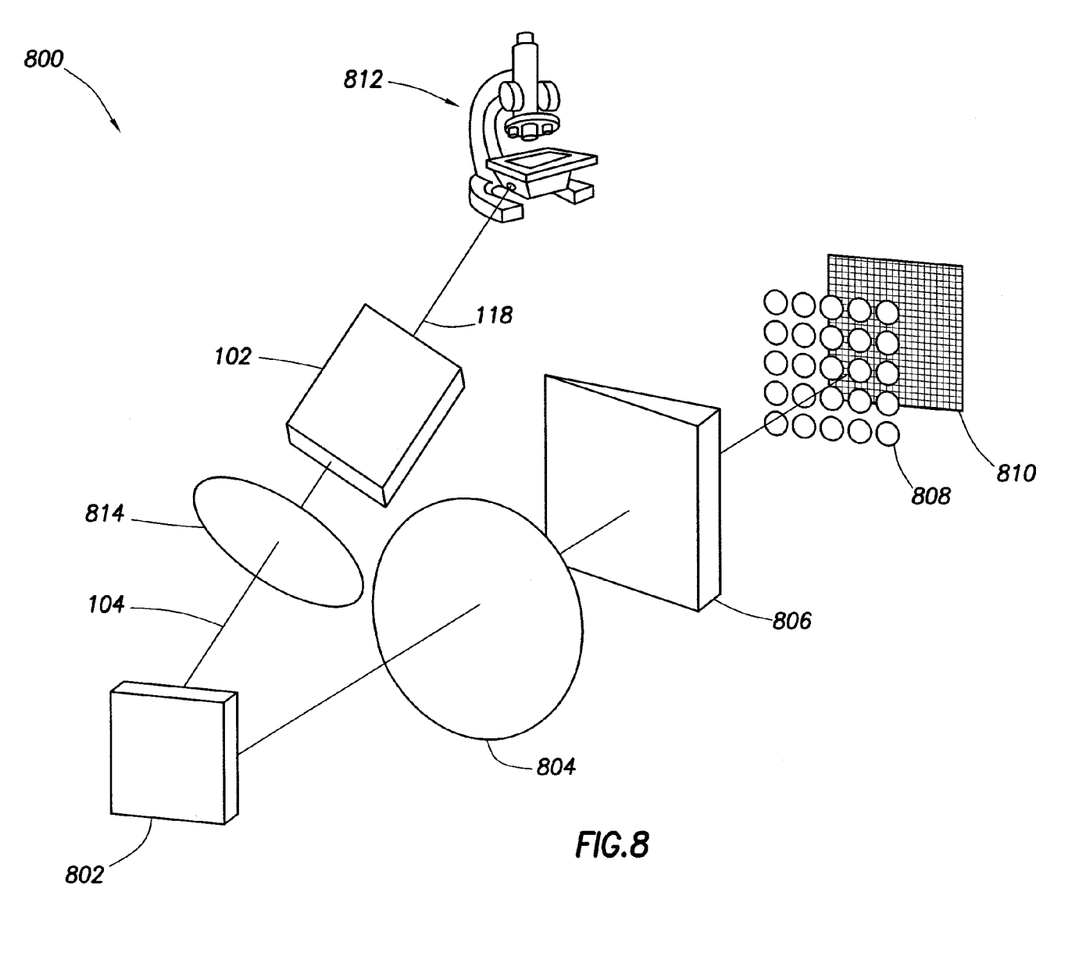
FIG. 8 shows a perspective view of an image mapping spectropolarimeter in accordance with one or more embodiments of the invention.

FIG. 8 shows a perspective view of an image mapping spectropolarimeter in accordance with one or more embodiments of the invention. Image mapping spectropolarimeter 800 includes spectropolarimeter 102, focusing lens 814 image mapper 802, collecting lens 804, dispersive element 806, and reimaging lens array 808. Spectropolarimeter 102 is configured to receive emitted EM field 118 that emanates from an output port of microscope 812. Spectropolarimeter 102 is configured to modulate the spectrum of emitted EM field 118 according to the polarization state of emitted EM field 118, thus, creating polarization encoded EM field 104. Focusing lens 814 is configured to focus polarization encoded EM field 104 onto image mapper 802. Image mapper 802 is configured to redirect a plurality of portions of the polarization encoded EM field 104 along multiple directions (not shown). Collecting lens 804 is configured to collimate the plurality of portions of a mapped image, similarly to that shown in FIG. 5. The plurality of portions of the mapped image are shown as a singe ray, for clarity. Dispersive element 806 is configured to spectrally disperse (not shown) the plurality collimated mapped image portions (not shown), similarly to that shown in FIG. 5. Dispersive element 806 may include any optical element known in the art having dispersive characteristics, for example, a single prism, prism pair, or diffraction grating. Furthermore, dispersive element 806 may include an array of prisms or an array diffraction gratings. Reimaging lens array 808 is configured to reimage image the plurality of mapped spectra onto detector array 810.

As shown in FIG. 8, reimaging lens array 808 includes a five by five array of reimaging lenses. Thus, this system may be employed with, for example, an image mapper 802 having 25 distinct mirror or refractor surfaces each with a distinct angle or, for example, may be employed with an image mapper 802 having 100 distinct mirror or refractor surfaces grouped in four groups having 25 mirror or refractor surfaces with distinct angles each.

Figure 9A:
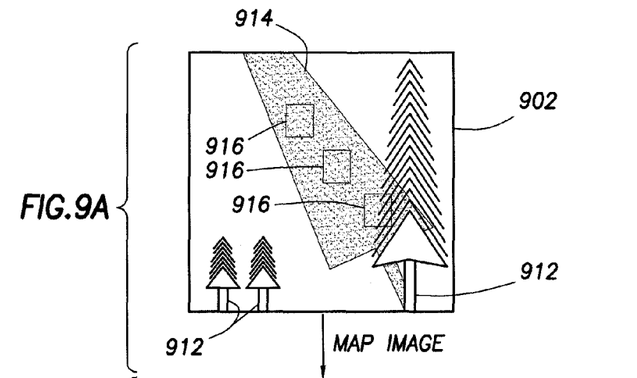
FIGS. 9A-C shows a graphical flow chart that illustrates the operational principles of image mapped spectropolarimetry.
Figure 9B:
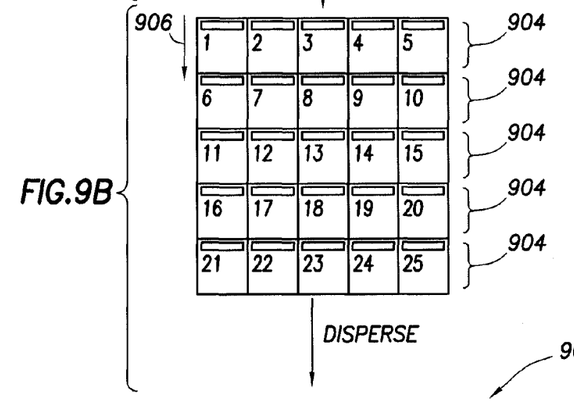
Figure 9C:
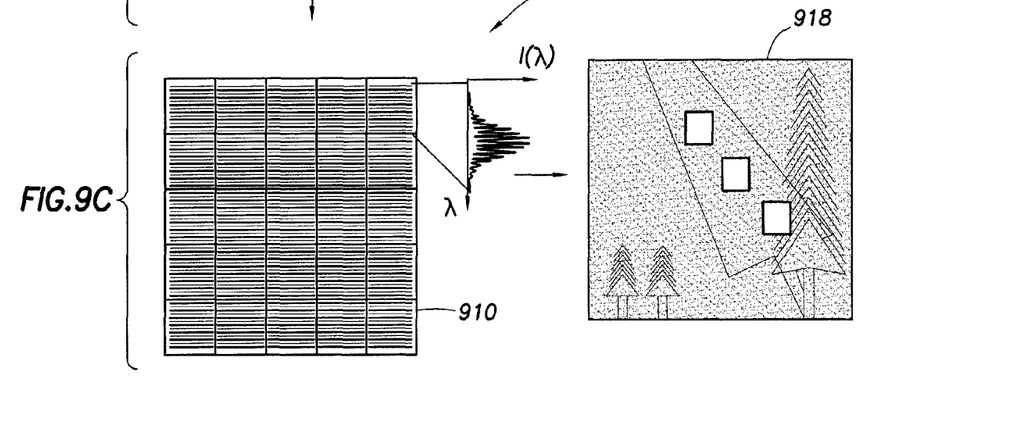

FIGS. 9A-C show an example of image mapped spectropolarimetry in accordance with one or more embodiments of the invention. FIG. 9A depicts scene 902 that may include, for example, trees 912, shadow 914, and hidden objects 916. Hidden objects 916 may further include, for example, vehicles or rooftops arranged so as to be barely visible due to low light levels or poor image contrast. An intermediate image of scene 902 may be image mapped in accordance with the description above with reference to FIGS. 1-8. In this embodiment, an image mapper is employed that includes 25 distinct reflective surfaces configured to produce a mapped image that includes 25 distinct image slices 1-25.

One effect of the image mapping is to redirect or map these 25 slices to 25 different sub-locations 1-25 on the front surface of, for example, a dispersing reimager as described in FIGS. 4, 5, and 7. An example of 25 distinct slices of an image located at 25 different sub-locations on the front surface of a dispersing reimager is shown in FIG. 9B. Alternatively, a number L of grouped elements may be employed in the image mapper as described in reference to FIGS. 4A-4B which will result in L image slices being present at each sub-location.

It is useful to note that FIG. 9B may alternatively be interpreted to depict the refocused image on the detector array if the dispersive elements were not present in the dispersing reimager. In this scenario, multiple image slices 1-25 would be separated on the detector by 25 non-illuminated or dark regions 904. The dark regions that separate the 25 image slices allow room for each slice to be spectrally dispersed by spatial separation of the spectral components of each point that makes up an image slice. Spatial separation of the spectral components occurs according to the description above in reference to FIGS. 2-8 along spectral separation directions 906.

Thus, the result of image mapping, followed by spectral dispersion and reimaging onto a detector array 910, is a plurality of modulated spectra 908, an example of which is shown in FIG. 9C according to one or more embodiments of the invention. Thus, each sub-detector (or pixels in the case of a CCD) on the detector array measures the value of a modulated spectrum $D(x,y,\lambda)$ that originates from a specific point $(x,y)$ on the sample. One of ordinary skill will understand that several different methods may be used to convert spectral information into polarization information according to known methods of spectropolarimetery. For example, the modulation of the modulated spectrum may be converted to the values of the four Stokes parameters, $S_0$, $S_1$, $S_2$, $S_3$ using Fourier analysis of the modulated spectrum. Thus, one column of the detector array contains the polarization information for one $(x,y)$ point in the scene. Accordingly, one single acquisition event of the detector array is enough to acquire all the information necessary for a full 2D reconstruction of the sample. The full 2D reconstruction further includes a traditional (based only on intensity of scattered or reflected EM waves) 2D image of the scene, a 2D spectrum of the scene, and a 2D polarization profile 918 of the scene.

The 2D spectrum of the scene shown on detector 910, and the 2D polarization profile 918 of the scene may be used to extract information from the scene not available in the traditional 2D image of the scene. For example, information regarding the chemical makeup of different points on the scene may be extracted from the 2D spectrum. The 2D polarization profile 918 of the scene may be used to identify objects that may be hidden from view in the traditional 2D image of the scene. For example, EM waves emanating from hidden objects 916 may have a higher degree of polarization than their surroundings resulting in hidden objects 916 having a high contrast in 2D polarization profile 918, as shown in FIG. 9C.

Figure 10:
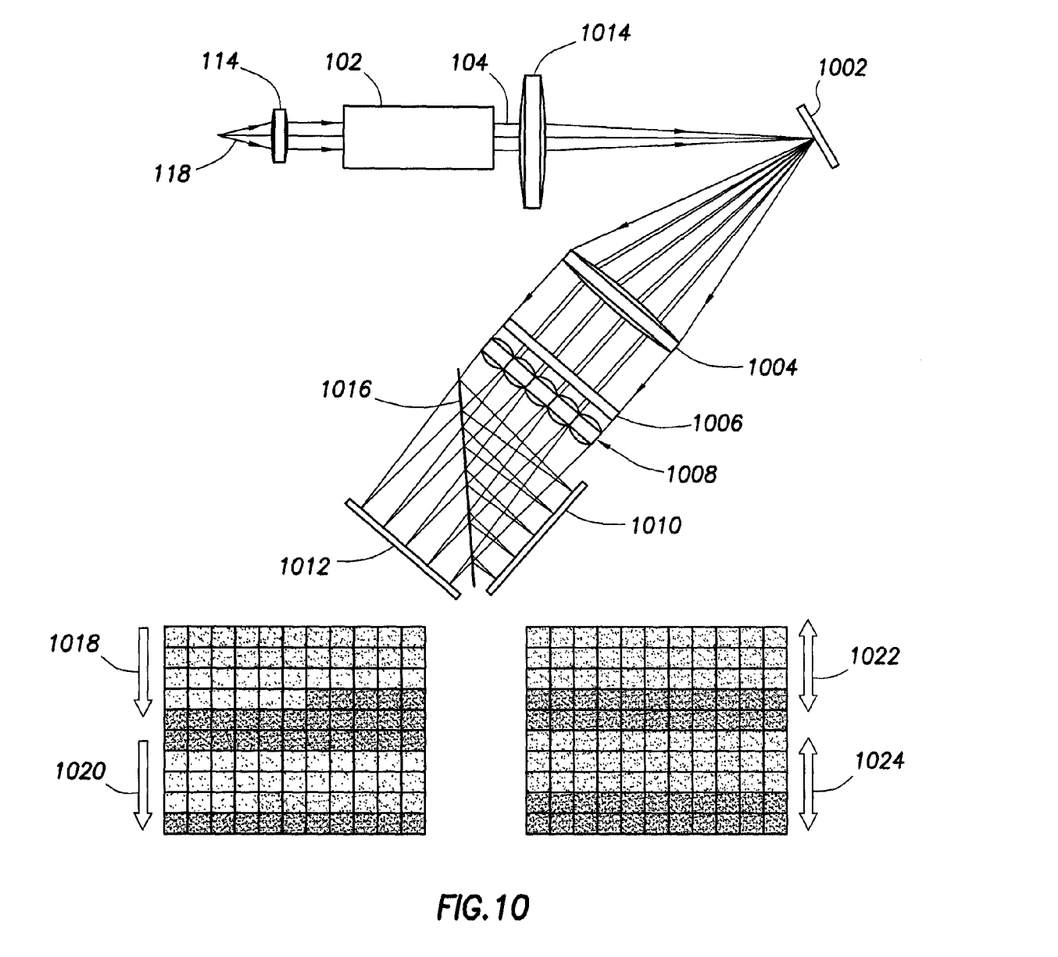
FIG. 10 shows dual-band image mapping spectropolarimeter in accordance with one or more embodiments of the invention

FIG. 10 shows a dual band image mapping spectropolarimeter in accordance with one or more embodiments of the invention. The dual band image mapping spectropolarimeter includes collecting lens 114 spectropolarimeter 102, focusing lens 1014, image mapper 1002, collecting lens 1004, dispersive element 1006, reimaging lens array 1008 dichroic beam splitter 1016, detector 1010 and detector 1012. Collecting lens 114 is configured to collect emitted the EM field 118 emanating from a point on a sample or scene. Spectropolarimeter 102 may be configured as shown in FIG. 2. Spectropolarimeter 102 is further configured to receive emitted EM field 118 and to modulate spectrum of emitted EM field 118 according to the polarization state of emitted EM field 118, thus, creating polarization encoded EM field 104. Focusing lens 1014 is configured to focus polarization encoded EM field 104 onto image mapper 1002. Image mapper 1002 is configured to redirect a plurality of portions of the polarization encoded EM field 104 along multiple directions (only five directions are shown). Collecting lens 1004 is configured to collimate the plurality of portions of a mapped image, similarly to that shown in FIG. 5. The plurality of portions of the mapped image are shown as a plurality of rays, for clarity. Dispersive element 1006 is configured to spectrally disperse (not shown) the plurality collimated mapped image portions, similarly to that shown in FIG. 5. Dispersive element 1006 may include any optical element known in the art having dispersive characteristics, for example, a single prism, prism pair, or diffraction grating. Furthermore, dispersive element 1006 may include an array of prisms or an array diffraction gratings. Reimaging lens array 1008 is configured to reimage image the plurality of mapped spectra onto detector arrays 1010 and 1012. Dichroic beam splitter 1016 is configured to reflect EM waves having a first predetermined range of wavelengths and to transmit EM waves having a second predetermined range of wavelengths. For example, dichroic beam splitter 1016 may be configured to transmit mid-wavelength infra-red (MWIR) and to reflect long wavelength infra-red (LWIR). Thus, detector array 1012 may be optimized for detection of MWIR and detector array 1010 may be optimized for detection of LWIR. Similarly to FIG. 9C, spectra may be dispersed along regions 1018 and 1020 of detector 1012 and along regions 1022 and 1024 of detector 1010.

One of ordinary skill will understand that any number of dichroic beam splitters may be placed at any number of locations in the system without departing from the scope of the present disclosure. For example, placing a dichroic beam splitter between image mapper 1002 and collecting lens 1004 may allow for the use of multiple dispersing reimagers each optimized for a given spectral range.

As shown in FIG. 10, reimaging lens array 1008 includes a five by five array of reimaging lenses. Thus, this system may be employed with, for example, an image mapper 802 having 25 distinct mirror or refractor surfaces each with a distinct angle or, for example, may be employed with an image mapper 802 having 100 distinct mirror or refractor surfaces grouped in four groups having 25 mirror or refractor surfaces with distinct angles each.

Figure 11:
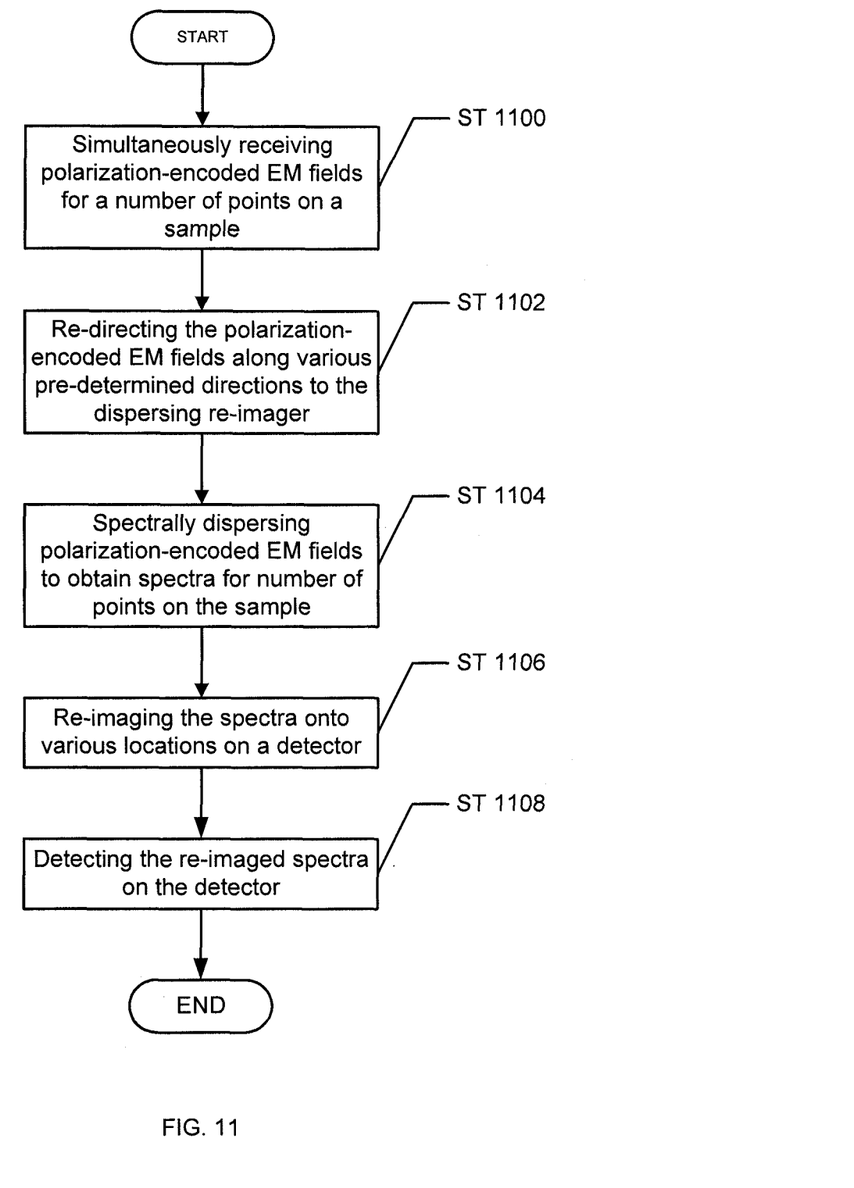
FIG. 11 shows a flow chart describing a method in accordance with one or more embodiments of the invention.

FIG. 11 shows a flow chart describing a method in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

In Step 1100, simultaneously receiving polarization-encoded EM fields for a number of points on a sample during a single acquisition event. In Step 1102, re-directing the polarization-encoded EM fields along various pre-determined directions to the dispersing re-imager. In one embodiment of the invention, Step 1102 is performed by the image mapper. In Step 1104, the polarization-encoded EM fields are spectrally dispersed to generate spectra, where the spectra include one spectrum for each of the number of points referenced in Step 1100. In Step 1106, re-imaging the spectra to various location on a detector. In Step 1108, detecting the re-imaged spectra on the detector. At this stage, a computer (or other processing device) uses the re-imaged spectra to generate 2D images based on the emitted EM wave intensity, spectral characteristic, and polarizing nature of the sample.

One or more embodiments of the invention may provide an image mapped spectropolarimetry system that may acquire three simultaneous images based on intensity, spectral, and polarization information of a sample in a single acquisition event of the detector or detector array without the need for scanning of the system or the sample. One or more embodiments of the invention may allow for a ruggedized, spatially compact system without moving parts, thus reducing cost and increasing the utility in applications requiring small areas, such as endoscopy or demanding environments such as those found in military applications. One or more embodiments of the invention allow for high speed acquisition of the intensity, spectral, and polarization based 2D images, thus reducing artifacts caused by sample motion. One or more embodiments of the invention allow for an increased signal-to-noise ratio over existing spectropolarimetry systems by increasing the fraction of time during image acquisition that is devoted to light collection and by increasing optical throughput through the system.

One of ordinary skill will appreciate that image mapped spectropolarimetry may be employed with any known form of spectropolarimetry and is not limited simply to the embodiment of channeled spectropolarimetry disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for imaging a sample, comprising:
    during a single acquisition event:
        receiving a plurality of polarization-encoded electromagnetic (EM) fields from a plurality of points on the sample comprising a first polarization-encoded EM field for a first point and a second polarization-encoded EM field for a second point;
        redirecting the first polarization-encoded EM field along a first pre-determined direction to a first location on a dispersing re-imager and the second polarization-encoded EM field along a second pre-determined direction to a second location on the dispersing re-imager;
        spectrally dispersing the first polarization-encoded EM field to obtain a first spectrum;
        re-imaging the first spectrum onto a first location on a detector;
        spectrally dispersing the second polarization-encoded EM field to obtain a second spectrum;
        re-imaging the second spectrum onto a second location on the detector; and
        detecting the first re-imaged spectrum and the second re-imaged spectrum.

2. The method of claim 1, wherein the first polarization-encoded EM field comprises a plurality of EM fields emanating along a z-direction in the sample for the first point.

3. A system, comprising:
    an image mapper configured to, during a single acquisition event:
        receive a plurality of polarization-encoded electromagnetic (EM) fields from a plurality of points on a sample comprising a first polarization-encoded EM field for a first point and a second polarization-encoded EM field for a second point;
        redirect the first polarization-encoded EM field along a first pre-determined angle to a first location on a dispersing re-imager and the second polarization-encoded EM field along a second pre-determined angle to a second location on the dispersing re-imager;
    the dispersing re-imager configured to:
        spectrally disperse the first polarization-encoded EM field to obtain a first spectrum;
        re-image the first spectrum on to a first location on a detector;
        spectrally disperse the second polarization-encoded EM field to obtain a second spectrum;
        re-image the second spectrum on to a second location on the detector;
    the detector configured to:
        detect the first re-imaged spectrum and the second re-imaged spectrum.

4. The system of claim 3, further comprising:
    a spectropolarimeter configured to generate the plurality of polarization-encoded EM fields and provide the plurality of polarization-encoded EM fields to the image mapper.

5. The system of claim 4, wherein the spectropolarimeter comprises a first retarder and a second retarder, where a slow axis of the first retarder is oriented at a 45-degree angle relative to a slow axis of second retarder about an optical axis of the spectropolarimeter.

6. The system of claim 5, wherein the spectropolarimeter further comprises a polarizer, wherein a transmission axis of the polarizer is parallel to a fast axis of the first retarder.

7. The system of claim 3, wherein the image mapper is refractive.

8. The system of claim 7, wherein the dispersing re-imager comprises an array of field of view correctors configured to receive the plurality of polarization-encoded EM fields from the image remapper and to shift each of the plurality of polarization-encoded EM fields to obtained a plurality of shifted polarization-encoded EM fields.

9. The system of claim 8, wherein the dispersing re-imager further comprises an array of dispersive elements configured to receive the plurality of shifted polarization-encoded EM fields and to spectrally disperse each of the plurality of spectra comprising the first spectrum and the second spectrum.

10. The system of claim 9, wherein the dispersing re-imager further comprises an array of reimaging lenses configured to the plurality of spectra and to re-image the plurality of spectra on to the detector.

11. The system of claim 3, wherein the detector comprises a two-dimensional (2D) array of EM radiation detectors.

12. The system of claim 11, the detector is a charged-couple device.

* * * * *